Aug. 13, 1968  J. C. DIEPEVEEN  3,396,856
PRECISION DRIVE STRUCTURE FOR ROTATABLE MEMBER
Filed Oct. 10, 1966  2 Sheets-Sheet 1
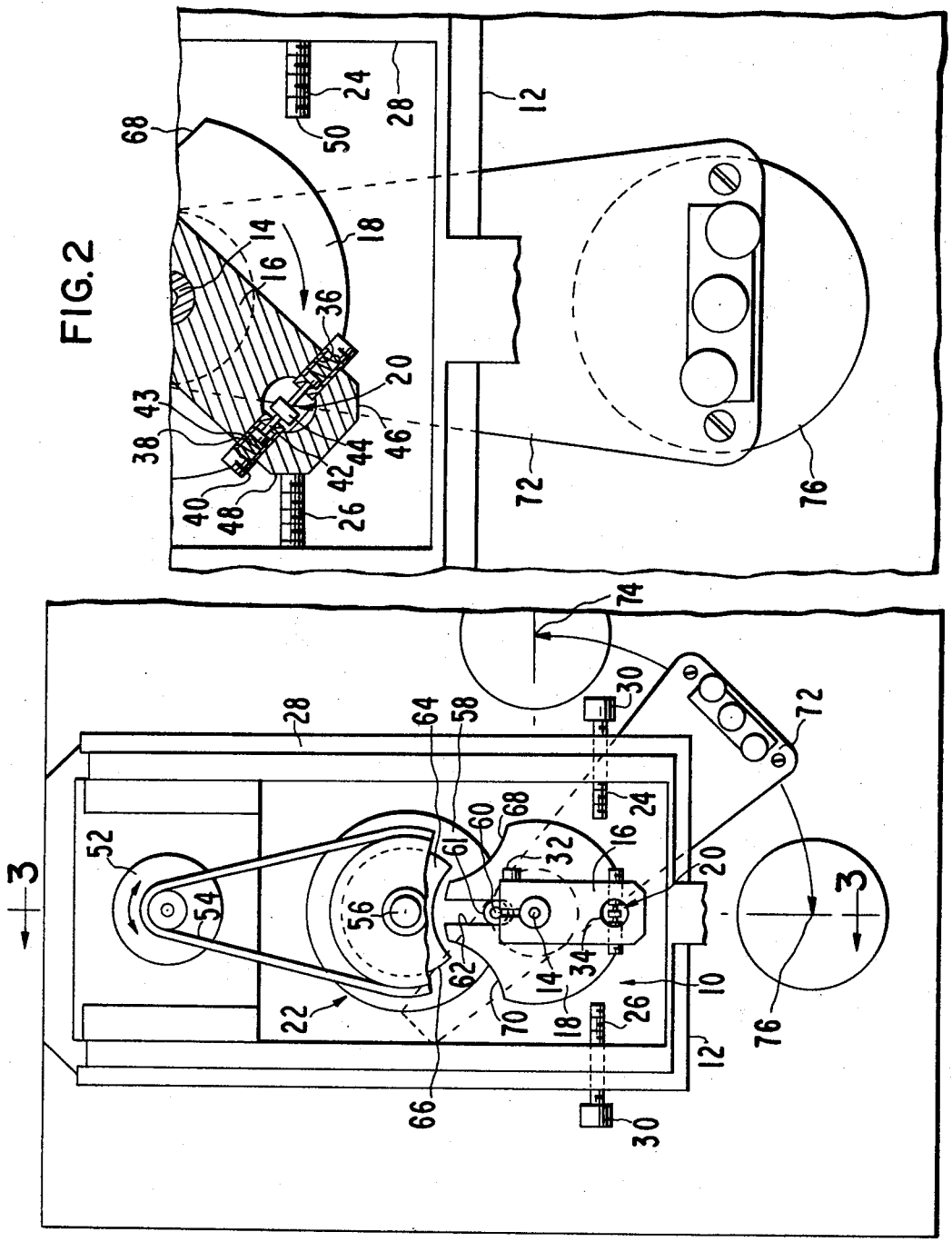
INVENTOR.
JOHN C. DIEPEVEEN
BY Townsend and Townsend
ATTORNEYS Aug. 13, 1968   J. C. DIEPEVEEN   3,396,856
PRECISION DRIVE STRUCTURE FOR ROTATABLE MEMBER
Filed Oct. 10, 1966   2 Sheets-Sheet 2
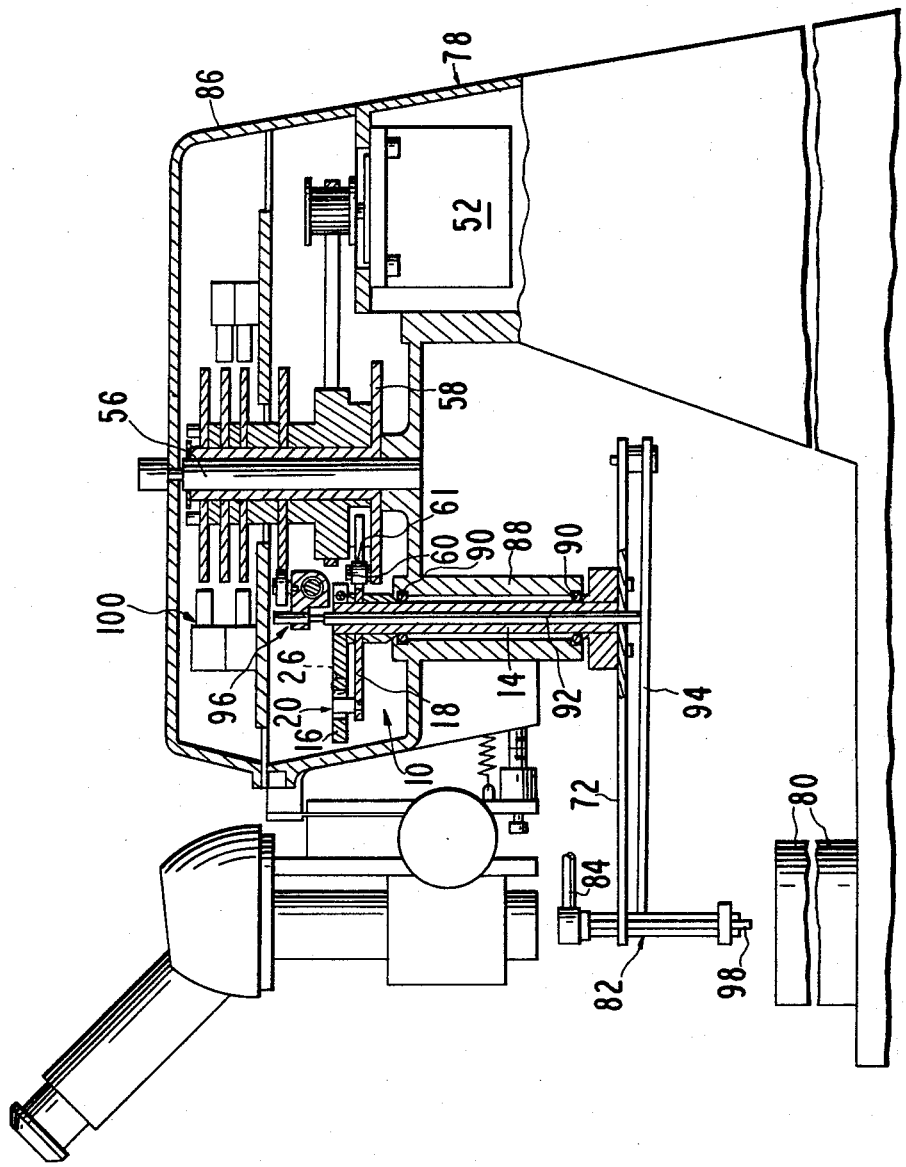
INVENTOR.
JOHN C. DIEPEVEEN
BY Townsend and Townsend
ATTORNEYS United States Patent Office 3,396,856
Patented Aug. 13, 1968

3,396,856
PRECISION DRIVE STRUCTURE FOR
ROTATABLE MEMBER
John C. Diepeveen, Sunnyvale, Calif., assignor to
Unitek Corporation, Monrovia, Calif., a corporation of California
Filed Oct. 10, 1966, Ser. No. 585,365
8 Claims. (Cl. 214—1)

This invention relates to improvements in drive mechanisms, and, more particularly, to rotational drive structure for accurately positioning a member at either of a pair of operative locations.

The present invention resides in an improved drive assembly for a rotatable, utilitarian member wherein the member is rotated between a pair of arcuately spaced, operative positions and is stopped precisely at each position notwithstanding the presence of machining and other errors inherent in the assembly itself which would ordinarily result in deviations of the member from said positions. To accomplish this result, a pair of stops are employed with a rotatable arm, the latter being coupled to the above member. The arm is connected by spring means to a rotor capable of moving in opposed directions along a predetermined path. The spring means allows the rotor and arm to move together until the arm is stopped. At this time, the member is accurately positioned to perform a desired function, but the rotor continues moving through a limited distance under the influence of the power source connected to it. It is during this continued movement of the rotor that the aforesaid errors have any effect. Since the arm and thereby the member will have been stopped prior to this continued movement of the rotor, these errors will not affect the positioning of the member and accuracy in the placement of the member attained.

While the invention is suitable for a number of different applications, it is especially adapted for use in the handling of articles of extremely small dimensions, such as semiconductor chips or the like. After manufacture, a semiconductor chip must be picked up from one area and transferred to other areas for further processing. For instance, the chip may be placed on a support, picked up from the support and transferred to a location above a mounting structure and then deposited on the mounting structure by means of which it is in position to be coupled to electrical terminals. All of these steps generally require a machine tool to assure accuracy not only in picking up and depositing a chip but also in moving it from one place to another. Rotational drive structures generally give the best results as the power source for a tool of this type to achieve the greatest accuracy. However, certain errors, notably backlash, are inherent in the operation of such drive structures. These errors only have an appreciable effect when the drive structure reverses its direction of movement. This, of course, occurs adjacent to the ends of the path of travel of the shaft or rotor which effects the movement of the tool.

To prevent these errors from having any affect on the movement of the tool, the present invention provides stops which limit the tool movement to an increment of the total path traversed by the rotating part of the drive structure. Specifically, the tool is prevented from moving under the influence of the drive rotor when the latter is approaching the ends of its path of travel. The above mentioned stops assure that the tool is halted before the rotor reaches the path extremities. The stops are adjustable so that the desired operative positions of the tool can be accurately established and the tool will always stop at these positions even though the drive means continues to be subject to the aforementioned errors. Accuracy in transferring an article handled by the machine is thereby attained and increased reliability in the resulting product of which the article becomes a part is thereby assured.

The primary object of this invention therefore is to provide a drive structure having a rotatable actuating arm driven by a reversible rotor wherein the arm is stopped as the rotor approaches each end of its path of travel and remains at rest until the rotor has moved a finite distance away from each end, so that errors in the operation of the rotor which arise at the ends of this path will have no effect on the arm movement to thereby assure great accuracy in the positioning of apparatus connected to the arm.

A further object of this invention is to provide a drive structure of the aforesaid character wherein adjustable screws are used to stop the movement of the actuating arm, so that the path of movement of the arm can be changed as desired.

Another object of the invention is to provide an improved article transfer apparatus having article pickup means and a drive structure of the type described, whereby articles of extremely small dimensions can be picked up from one location, transferred to a second location, and placed at the second location with accuracy to render the apparatus highly suitable for use in handling semiconductor chips.

FIG. 1 is a top plan view of a preferred form of the drive structure illustrating the actuating arm coupled to a reversible rotor and disposed midway between a pair of screw stops;

FIG. 2 is a view similar to FIG. 1, but showing the arm at one end of its path of travel in engagement with the corresponding screw stop; and FIG. 3 is a side elevational view, partly in section, showing the drive structure as a part of an article transfer mechanism.

Drive structure 10 illustrated in FIGS. 1 and 2 includes a support 12, a shaft 14 journalled on support 12, an actuating arm 16 secured to shaft 14, a reversible rotor 18 rotatably mounted on shaft 14 and coupled by spring means 20 to arm 16, and power means 22 for rotating said rotor in opposed directions between a pair of spaced limits. The invention resides in stopping the movement of arm 16 before rotor 18 reaches either limit of its path of rotation. The arm is stopped by a pair of spaced screw stops 24 and 26 threadably mounted in a wall 28 forming a part of support 12. Spring means 20 allows rotor 18 to continue moving through a limited distance even though arm 16 has been stopped and this distance is sufficiently long to assure that backlash and other errors due to the reversal of rotor 18 arise only during the time when arm 16 is at rest. Thus, such errors have no effect on the positioning of this arm and it is always stopped precisely at the same location upon striking a screw stop. Any structure connected to arm 16 through shaft 14 or otherwise will also be stopped in the same way. The path of movement of arm 16 will therefore have a fixed arcuate length established by the inner ends of screw stops 24 and 26. This path length can be varied adjusting stops 24 and 26. A head 30 on each stop allows normal adjustments to be readily made.

Arm 16 is releasably secured to shaft 14 by means of a screw 32 coupled to the two sections of the bifurcated inner end of the arm as shown in FIG. 1. The outer end of arm 16 is provided with a circular aperture 34 therethrough by means of which it is coupled to spring means 20. As shown in FIG. 2, spring means 20 includes a pair of plungers 36 and 38 connected to arm 16 at diametrically opposed locations relative to aperture 34. Each plunger has a cylindrical element 40 threadably mounted in a respective bore in the arm and a piston-like rod 42 biased by a spring 43 into aperture 34. Rods 42 have flat inner end faces which engage the opposed flat sides of a pin 44 which is secured to rotor 18 and extends through the aperture. Thus, arm 16 is operably coupled to rotor 18 for normal rotation therewith. However, the rotor can move relative to the arm through a limited distance since pin 44 can move in either direction within the aperture and, in doing so, compresses the corresponding spring 43.

Arm 16 has a pair of angularly disposed flat end faces 46 and 48 for engaging the flat end faces 50 of respective screw stops 24 and 26. Each of the faces 46 and 48 is substantially parallel with the corresponding face 50 when contact between arm 16 and the corresponding screw stop is made.

Power means 22 may be of any construction, but for purposes of illustration, it is a partial Geneva drive of which rotor 18 forms a part. A reversible motor 52 is coupled by a belt and pulley assembly 54 to a rotatable shaft 56 parallel to shaft 14 and carried by support 12. A disc 58 secured to shaft 56 has a pin 60 on which a roller 61 is mounted, the roller being received within a slot 62 formed in rotor 18. A stop plate 64 is also secured to shaft 56 and has a convex outer surface 66 which complementally engages concave surfaces 68 and 70 of rotor 18 when pin 60 is at the extremities of its path of travel. Thus, rotor 18 is stopped prior to being reversed in direction. Suitable control means (not shown in FIGS. 1 and 2) is provided to actuate the motor 52.

In use, drive structure 10 is coupled to a utilitarian arm or member 72 by connecting the latter to shaft 14. Thus, arm 72 moves and stops with arm 16 and, because arm 16 has an unchanging path length of a predetermined value, arm 72 will always be stopped at the same two operative positions as arm 16 engages stops 24 and 26. The movement of arm 72, like the movement of arm 16, is not affected by the backlash and other errors which arise upon reversing the direction of movement of rotor 16.

In FIG. 1, arm 72 is midway between the ends of its path of travel, such ends being shown as flat, circular surfaces 74 and 76 corresponding to stops 24 and 26. In FIG. 2, arm 72 is shown with its outer end directly aligned with a central region of surface 76. The arm will always stop at this location each time arm 16 engages stop 26 because the movement of arm 16 is free of the aforementioned errors.

It will be apparent to those skilled in the art that drive structure 10 is adapted for a wide variety of applications. One application of the invention is with an article transfer device 78 of the type shown in FIG. 3. The purpose of device 78 is to transfer a miniaturized article, such as a semiconductor chip, from one location to another.

To this end, surfaces 74 and 76 represent the upper faces of a pair of spaced mounting posts 80, only one of which is shown in FIG. 4. A vacuum pickup means 82 is mounted on the outer end of arm 72 and is coupled by a conduit 84 to a source of vacuum.

Support 12 of FIGS. 1 and 2 is represented by a closed housing 86 in FIG. 3, the latter containing drive structure 10 with shaft 14 extending through a mounting sleeve 88 projecting downwardly from housing 86. Bearings 90 journal shaft 14, the latter being tubular to accommodate a vertically shiftable rod 92 coupled at its lower end to a swingable member 94 forming a part of pickup means 82. Arm actuated pivoting means 96 is actuated upon rotation of shaft 56 for raising and lowering rod 92. This allows the lower tip 98 of pickup means 82 to move toward and away from a mounting post 80 to effect pickup and deposit of an article. Motor 52 is disposed within housing 86 and is controlled by arm actuated switch means 100 responsive to the rotation of shaft 56.

In operation, a miniaturized article is placed on one of the posts 80 and arm 72 is swung in one direction until arm 16 engages one of the screw stops. Tip 98 is then lowered and engages the article whereupon the vacuum source is energized so that the article will adhere to tip 98. Pickup means 82 is then raised and arm 72 is rotated until arm 16 engages the other screw stop. Arm 72 is then brought to a halt and pickup means 82 is again lowered to deposit the article on the other post 80.

Great accuracy in handling and depositing the article is achieved by employing drive structure 10 in device 78. Specifically, pickup means 82 is always stopped at particular locations directly above posts 80 so that an article to be transferred can first be placed at a particular location on one of the posts while structure to be coupled with the article can be placed at a particular location on the other post. These locations can be marked by reference lines or similar means. The positioning of the article is extremely important where the dimensions of the article are such that hand held tools are completely ineffective in providing the desired results. Moreover, by stopping pickup means 82 at predetermined locations, minute adjustments need not be made every time an article is to be picked up and transferred. Thus, a large number of articles can be handled in a minimum of time and device 78 is thereby rendered adapted for high volume production of components utilizing articles of the type described.

While one embodiment of this invention has been shown and described, it will be apparent that other adaptations and modifications can be made without departing from the true spirit ad scope of the invention.

What is claimed is:

1. In combination: a pair of spaced members; means mounting said members for rotation about a common axis with said members being rotatable relative to each other; means coupled with one of the members for rotating the same in opposed directions along a predetermined path; spring means coupling said members together at a location spaced from said axis to permit the members to move normally together along said path and to allow movement of said one member through a limited distance along said path relative to the other member when said other member is stopped; and means adjacent to each end of said path for stopping said other member before said one member reaches the corresponding end of said path whereby said one member will move relative to the other member through at least a portion of said distance to the last-mentioned end of said path under the influence of said moving means.

2. The combination as set forth in claim 1, wherein said stopping means includes a pair of adjustable abutments.

3. The combination as set forth in claim 1, wherein is included a support adjacent to said path, said stopping means including a pair of screws threadably mounted on said support, said screws having respective ends engageable with said other member to stop the latter.

4. The combination as set forth in claim 1, wherein said stopping means includes a flat face, said other member having a flat surface for engaging said flat face when said other member is stopped.

5. The combination as set forth in claim 1, wherein is included a shaft defining said axis, said other member being secured to said shaft for rotation therewith, and an arm secured to said shaft in spaced relationship to said other member, whereby said arm is alternately moved and stopped under the influence of said other member.

6. The combination as set forth in claim 1, wherein said spring means includes a lateral projection on a first of said members, and a pair of spaced, spring-biased plungers carried by the second member, said plungers being disposed for engaging opposed sides of said projection.

7. The combination as set forth in claim 1, wherein said members are provided with respective surfaces in face-to-face relationship, said other member having an aperture therethrough at said location, said spring means including a pin secured to said one member and projecting outwardly from said surface thereof and extending through said aperture, a pair of spring-biased plungers reciprocally mounted on said other member at diametrically opposed locations relative to said aperture, said plungers being biased into said aperture and having respective inner ends engaging opposed sides of said pin.

8. Article transfer apparatus comprising: a support; a vertical shaft rotatably mounted on said support; a pair of spaced arms rigidly secured to said shaft adjacent to respective ends thereof, said arms extending laterally from said shaft, one of said arms having an aperture therethrough spaced from said shaft and said other arm having article pickup structure adjacent to its outer end; a rotor rotatably mounted on said shaft and disposed in proximity to said one arm; means coupled with said rotor for rotating the same in opposed directions along a predetermined arcuate path of travel; a pin rigidly secured to said rotor and extending into said aperture; a pair of plungers mounted on said one arm on diametrically opposed sides of said aperture, said plungers having respective springs biasing the plungers into said aperture and having inner ends engaging opposed sides of said pin, whereby said one arm and said rotor are coupled for normal rotation together and said rotor may move relative to said one arm through a limited distance when said one arm is stopped; a pair of spaced screw stops threadably mounted on said support adjacent to respective ends of said path, each screw stop being disposed for stopping said one arm before said rotor has reached the corresponding end of said path, whereby the rotor will move through at least a portion of said distance to the last-mentioned end under the influence of said rotating means.

References Cited
UNITED STATES PATENTS

| | | | |
|---|---|---|---|
| 2,593,355 | 4/1952 | Sivacek | 74—96 X |
| 2,753,734 | 7/1956 | Deibel | 74—96 X |

ROBERT G. SHERIDAN, *Primary Examiner.*

GEORGE F. ABRAHAM, *Assistant Examiner.*

UNITED STATES PATENT OFFICE
CERTIFICATE OF CORRECTION

Patent No. 3,396,856                            August 13, 1968

John C. Diepeveen

It is certified that error appears in the above identified patent and that said Letters Patent are hereby corrected as shown below:

Column 2, between lines 25 and 26, insert as a new paragraph, -- Other objects of this invention will become apparent as the specification progresses, reference being had to the accompanying drawings wherein: --; line 59, after "varied" insert -- by --. Column 4, line 29, "ad" should read -- and --.

Signed and sealed this 24th day of February 1970.

(SEAL)
Attest:

Edward M. Fletcher, Jr.                      WILLIAM E. SCHUYLER, JR.
Attesting Officer                                Commissioner of Patents